United States Patent [19]
Calvignac et al.

[11] Patent Number: 5,557,266
[45] Date of Patent: Sep. 17, 1996

[54] SYSTEM FOR CASCADING DATA SWITCHES IN A COMMUNICATION NODE

[75] Inventors: Jean Calvignac, La Gaude; Pierre Huon, Saint Laurent du Var; Daniel Orsatti, Cagnes-sur-Mer; Gilles Toubol, Volleneuve Loubet; Fabrice Verplanken, Cagnes-sur-Mer, all of France

[73] Assignee: International Business Machines Corporation, Armonk, N.Y.

[21] Appl. No.: 206,363

[22] Filed: Mar. 7, 1994

[30] Foreign Application Priority Data

Apr. 29, 1993 [EP] European Pat. Off. ............ 93480046

[51] Int. Cl.$^6$ ..................................... H03K 17/00
[52] U.S. Cl. .................. 340/825.02; 340/825.5; 340/825.05; 370/58.1; 370/85.13
[58] Field of Search .............. 340/825.05, 825.02; 370/67, 60, 85.13, 97, 61, 58.1, 58.2, 60.1, 94.3, 85.1

[56] References Cited

U.S. PATENT DOCUMENTS

| | | | |
|---|---|---|---|
| 4,833,605 | 5/1989 | Terada et al. | 364/200 |
| 5,144,293 | 9/1992 | Rouse | 340/825.02 |
| 5,151,897 | 9/1992 | Suzuki | 370/85.13 |
| 5,182,550 | 1/1993 | Masuda et al. | 340/825.05 |
| 5,189,414 | 2/1993 | Tawara | 340/825.5 |
| 5,222,064 | 6/1993 | Sagawa | 370/85.13 |
| 5,309,426 | 5/1994 | Crouse et al. | 370/58.1 |
| 5,309,437 | 5/1994 | Perlman et al. | 370/85.13 |

FOREIGN PATENT DOCUMENTS

| | | |
|---|---|---|
| 0387464 | 9/1990 | European Pat. Off. . |
| 0492972 | 7/1992 | European Pat. Off. . |
| 0505695 | 9/1992 | European Pat. Off. . |

*Primary Examiner*—Michael Horabik
*Assistant Examiner*—William H. Wilton, Jr.
*Attorney, Agent, or Firm*—Joscelyn G. Cockburn; Homer L. Knearl; Francis A. Sirr

[57] ABSTRACT

A system for cascading data switches in a communication node allows for transfer of data among a plurality of adapters (30-i), expanding a moderate low cost switch 31-1 with additional hardware (31-2, 31-3, 31-4) to interconnect more adapters. The data transfers are performed by a plurality of Burst Relaying Cascaders (32-i) which connect the plurality of switches (31-i). A similar interface connect each adapter to the switch. A set of address information is used by the system to route the data from the source adapter to the target adapter, allowing navigation among the intermediate switches. Each interface contains a table where the address of every adapter of the whole system could be constructed dynamically at each communication node configuration.

8 Claims, 10 Drawing Sheets

| FTDA | CTDA |
|------|------|
| 1 | X |
| 2 | Y |
| 3 | Z |
| ... | ... |
| N | T |

BURST ROUTING TABLE USED BY BURST RELAYING CASCADER

CONTROL UP EVEN

| P R D A 5 | P R D A 4 | P R D A 3 | P R D A 2 | P R D A 1 | P R D A 0 | S / R | C B R | P B C 14 | P B C 13 | P B C 12 | P B C 11 | P B C 10 | P B C 9 | P B C 8 | P B C 7 | P B C 6 | P B C 5 | P B C 4 | P B C 3 | P B C 2 | P B C 1 | P B C 0 | O | O | O | O | O | O | R N R | P T Y |
|---|---|---|---|---|---|---|---|---|---|---|---|---|---|---|---|---|---|---|---|---|---|---|---|---|---|---|---|---|---|---|

100-1

CONTROL UP ODD

| C T D A 5 | C T D A 4 | C T D A 3 | C T D A 2 | C T D A 1 | C T D A 0 | P T Y | F T D A 11 | F T D A 10 | F T D A 9 | F T D A 8 | F T D A 7 | F T D A 6 | F T D A 5 | F T D A 4 | F T D A 3 | F T D A 2 | F T D A 1 | F T D A 0 | I O D A 11 | I O D A 10 | I O D A 9 | I O D A 8 | I O D A 7 | I O D A 6 | I O D A 5 | I O D A 4 | I O D A 3 | I O D A 2 | I O D A 1 | I O D A 0 | P T Y |
|---|---|---|---|---|---|---|---|---|---|---|---|---|---|---|---|---|---|---|---|---|---|---|---|---|---|---|---|---|---|---|---|

100-2

CONTROL DN EVEN

| N T D A 5 | N T D A 4 | N T D A 3 | N T D A 2 | N T D A 1 | N T D A 0 | O | C B G | P B C 14 | P B C 13 | P B C 12 | P B C 11 | P B C 10 | P B C 9 | P B C 8 | P B C 7 | P B C 6 | P B C 5 | P B C 4 | P B C 3 | P B C 2 | P B C 1 | P B C 0 | O | N O D A 5 | N O D A 4 | N O D A 3 | N O D A 2 | N O D A 1 | N O D A 0 | O | P T Y |
|---|---|---|---|---|---|---|---|---|---|---|---|---|---|---|---|---|---|---|---|---|---|---|---|---|---|---|---|---|---|---|---|

100-3

CONTROL DN ODD

| | | | | | | F T D A 11 | F T D A 10 | F T D A 9 | F T D A 8 | F T D A 7 | F T D A 6 | F T D A 5 | F T D A 4 | F T D A 3 | F T D A 2 | F T D A 1 | F T D A 0 | I O D A 11 | I O D A 10 | I O D A 9 | I O D A 8 | I O D A 7 | I O D A 6 | I O D A 5 | I O D A 4 | I O D A 3 | I O D A 2 | I O D A 1 | I O D A 0 | P T Y |
|---|---|---|---|---|---|---|---|---|---|---|---|---|---|---|---|---|---|---|---|---|---|---|---|---|---|---|---|---|---|---|

100-4

← SWITCH/ADAPTER OR SWITCH/BURST-RELAYING-CASCADER SERIAL INTERFACES

*Fig. 10*

SYSTEM FOR CASCADING DATA SWITCHES IN A COMMUNICATION NODE

DESCRIPTION OF THE INVENTION

1. Field of the Invention

The present invention relates to a switching system for a communication node transferring data among a plurality of data processing units or network links and more particularly to a modular switching system capable of being expanded to interconnect additional data processors or network links.

The trend in modern data processing systems is towards large networks of data processors which exchange data among them and a central data processor to perform a variety of data processing operations. The data processors may be arranged in local networks linked to the central data processor. The central data processor controls the exchange of data through various circuitry including a switch which interconnects any data processor wishing to send data to another data processor with said other data processor under control of switch control logic (scheduler).

2. Background Art

An example of a switching system, which is described in the European Patent application published with the no. EP 387,464, comprises data switching means which are connected to each one of the N data processing units through a receive data bus and a transmit data bus. Each data processing unit comprises a set of outbound queues with one outbound queue associated with each one of the data processing units to which it may send data bursts for storing the data packets to be sent by the data processing unit to the data processing unit associated with said outbound queue. The packet switching is controlled by switch control logic which runs a switching algorithm.

The number of data processors that can be interconnected by a data switch is subject to limitations, mainly due to the limited amount of hardware logic that can be implemented on a single-switch control chip and the limited number of I/O lines which can be implemented on a single chip for the actual data switching. To overcome the above problems, many data switch chips could be used, but this would not be satisfactory since the limitation on the number of cells of the switch control chip could become predominant and the increased number of data switch chips could become a problem at the card design level.

SUMMARY OF THE INVENTION

An object of the present invention is to provide a switching system allowing a plurality of data processing units or network links to be interconnected with moderate size and low cost switches which can later on be expanded with additional hardware to interconnect more data processors and network links. This avoids the use of a large, expensive switch which would penalize the low, and mid-range machine configurations.

Another object of the present invention is to provide such a switching system where a device attaching a pair of switches does not have to be connected to specific or modified parts of the switches so that any switch network topology can be implemented.

Another object of the present invention is to provide such a switching system which does not depend on software operation so the attaching device can sustain the data rate of the switches.

The cascading switching system for a communication node according to the subject invention comprises a switching arrangement for establishing connection between a plurality of adapters and a switch and between pairs of switches. Each switching arrangement is Connected to a switch through an input bus and an output bus both identified by a same port identifier of the switch, so that this switching system will be able to selectively connect input busses to output busses in order to allow transfer of information to be performed between a source adapter and a target adapter. The switching system comprises:

an adapter interface which connects an adapter to a switch, and is responsive to address information received from a source adapter to determine the port identifier of an output bus of the attached switch and to forward the address information to an output bus where said address information is not the final target address, said final target address identifying the port identifier of a switch to which is attached the target adapter. A similar interface connects each pair of switches.

The invention will now be described in detail with reference to the drawings.

BRIEF DESCRIPTION OF THE DRAWINGS

FIG. 10 represents the switch/adapter or switch/Burst-Relaying-Cascader serial interfaces.

DETAILED DESCRIPTION OF THE INVENTION

Figure 1:
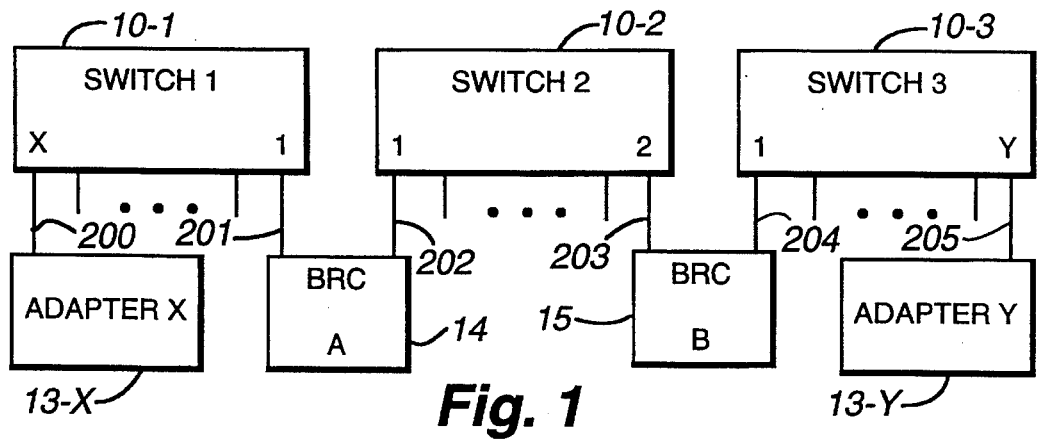
FIG. 1 represents a block diagram of switch configuration in which the invention is used.

The basic principle of the invention will be described with reference to FIG. 1 which shows a configuration of three switches 10-1, 10-2, 10-3 each having several ports. A number of data processors or network links, not shown in the figure, are attached to the ports of switches 10-1 to 10-3 through adapters such as 13-X and 13-Y to exchange bursts of data. In the embodiment shown, port 1 of switch 10-1 is connected to port 1 of switch 10-2 through a switching interface device called a Burst Relaying Cascader (BRC A 14). Similarly, port 2 of switch 10-2 is connected to port 1 of switch 10-3 through BRC B (15). Adapters 13-X and 13-Y are connected to ports X and Y of switches 10-1 and 10-3, respectively, by way of cables or busses 200 and 205, respectively. Burst Relaying Cascader A 14 is connected to port 1 of switch 10-1 by way of cable 201, and is connected to port 1 of switch 10-2 by way of cable 202. Burst Relaying Cascader B 15 is connected to port 2 of switch 10-2 by way of cable 203, and is connected to port 1 of switch 10-3 by way of cable 204.

In the preferred embodiment of the invention switches 10 are similar to the switching system described in the European Patent application published with the No. EP 387,464.

Figure 2A:
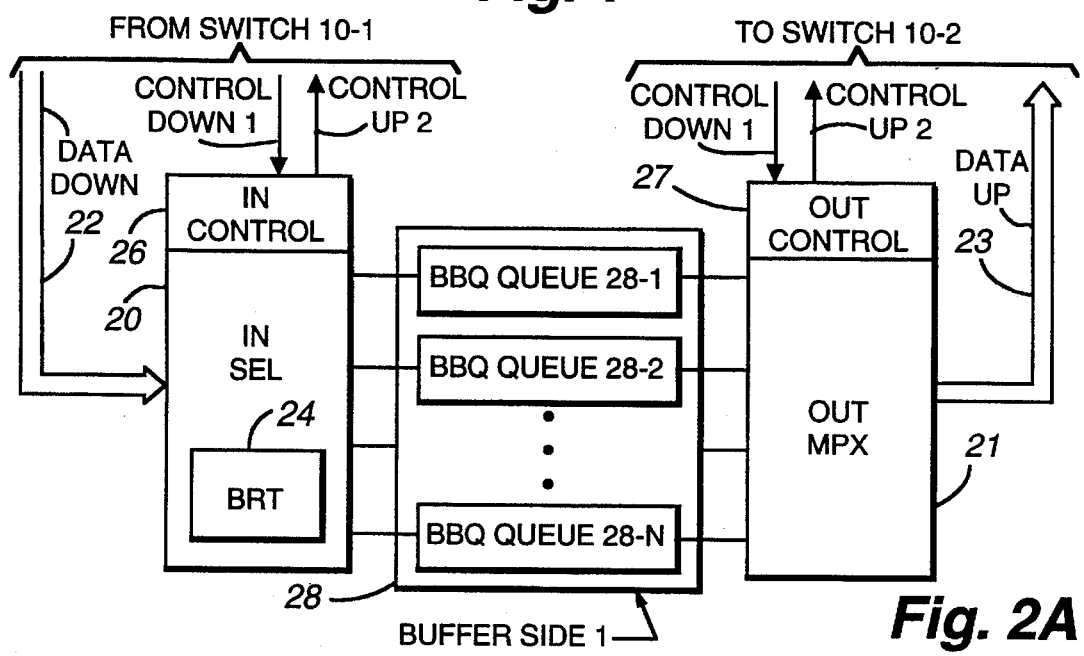
FIG. 2 consisting of FIG. 2A and FIG. 2B, represents the Burst Relaying Cascader logical structure (BRC in FIG. 1).
Figure 2B:
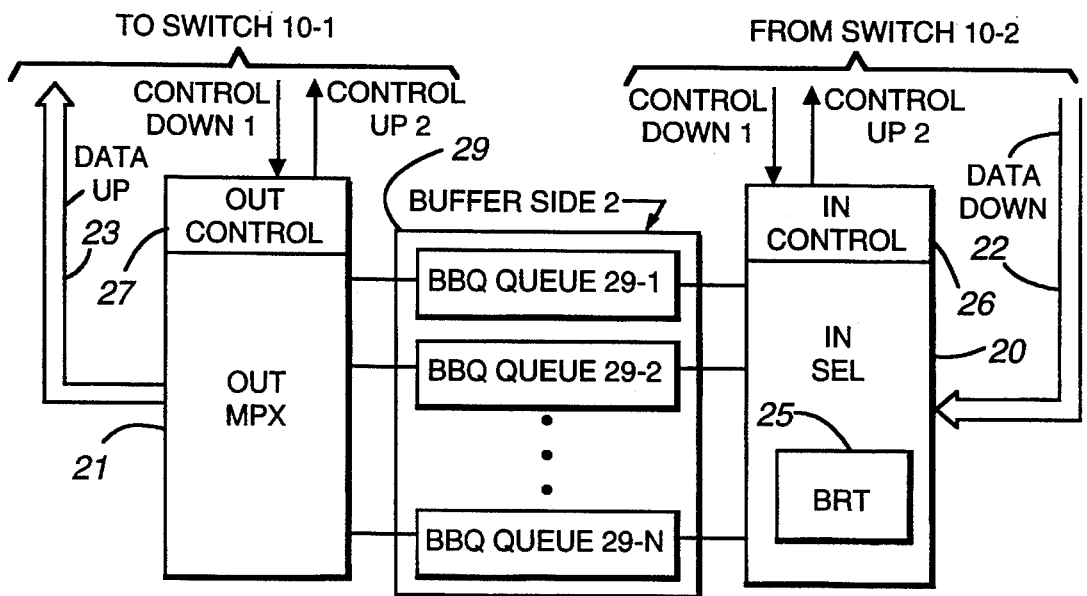

As shown in FIG. 2, each BRC is divided into two sides, shown in FIGS. 2A and 2B, one for each direction of transmission; each side is provided with a buffer (28, 29) which could be split into a set of logical buffers (28-1 to 28-N, 29-1 to 29-N), a logical buffer being provided for each port of the downstream data switches. The buffers receive data bursts from the upstream data switch and store said burst until a transmission grant is received from the downstream data switch allowing the transmission of the stored burst to the next switch. The buffers are arranged in a queue configuration to resolve asynchronism between the scheduling of FIG. 2A for the two interconnected switches. There is one Burst Buffer Queue (BBQ) for each port of the destination switch.

A detailed description of the BRC and of its operation will now be given. Only the process of transmitting data bursts (each burst contains a fixed number of bytes, for example 32) through buffer side 1 from a switch 10-1 to a switch 10-2 will be described since the process would be the same for transmission of data bursts from switch 10-2 to switch 10-1 through buffer side 2.

Each BRC includes an input section (20) connected to a data bus (Data Down 22) from switch 10-1, an output section (21) connected to a data bus (Data Up 23) attached to switch 10-2, and a Buffer (28) for this direction of transmission (Side 1 direction) which is split into a set of Burst Buffer Queues (BBQ) 28-1 to 28-N interfacing input section (20) and output section (21). Input section includes Input Control logic (IN CTL 26) receiving control signals from the upstream data switch 10-1, a selector (IN SEL 20) routing data bursts received on Data Down bus to selected BBQ's.

In accordance with the herein cited patent application EP 387,464, the switching operation in each switch is controlled by control up information which comprises: Packet Request Device Address (PRDA), which is provided by the BRC or Adapter interface module to the switch in order to enable/disable the switch to schedule the requested burst transfer; Packet Burst Control (PBC) which contains information qualifying the data burst sent through the data up lines (23), such as-First burst of message-Last burst of message-Byte count when the burst contains less than 32 bytes, and Configuration Target Device Address (CTDA) which holds the local destination of the burst. The present invention controls the switching operations using two more control up signals the Final Target Device Address (FTDA) and the Initial Origin Device Address (IODA).

Thus, the CTDA is the device address which the switch uses, in accordance with the cited patent application EP 387,464, for selecting the local target ports of the switch. The FTDA specifies the identifier of the adapter for which the burst is destined. Conversely, The IODA specifies the identifier of the adapter from which the burst originated. The last two adapter identifiers described (FTDA and IODA) are independent of the switch identifier, i.e. they indentify the adapters uniquely among the full set of adapters interconnected by any number of switches, whatever the network topology is. Thus a Software Network Manager, SNM (in FIG. 3) (35), attached to this switch cascade should be able to associate a different absolute identifier switch each attached adapter.

As shown with FIG. 10, the Switch/Adapter interfaces are modified, from the interface described in the patent application EP 387,464, to carry also the Final Target Device Address (FTDA) and the Initial Origin Device Address (IODA) information. These are mapped in 12-bit serial fields sent to a switch on a Control Up Odd wire (not shown) and received from a switch on a Control Down Odd wire not shown. The FTDA and IODA serial fields are each followed by a parity bit to detect errors. Only one Configuration Target Device Address (CTDA) field is still used and is followed by a parity bit too, while the Control Up Even and the Control Down Even interfaces are unchanged.

Figures 3, 4:
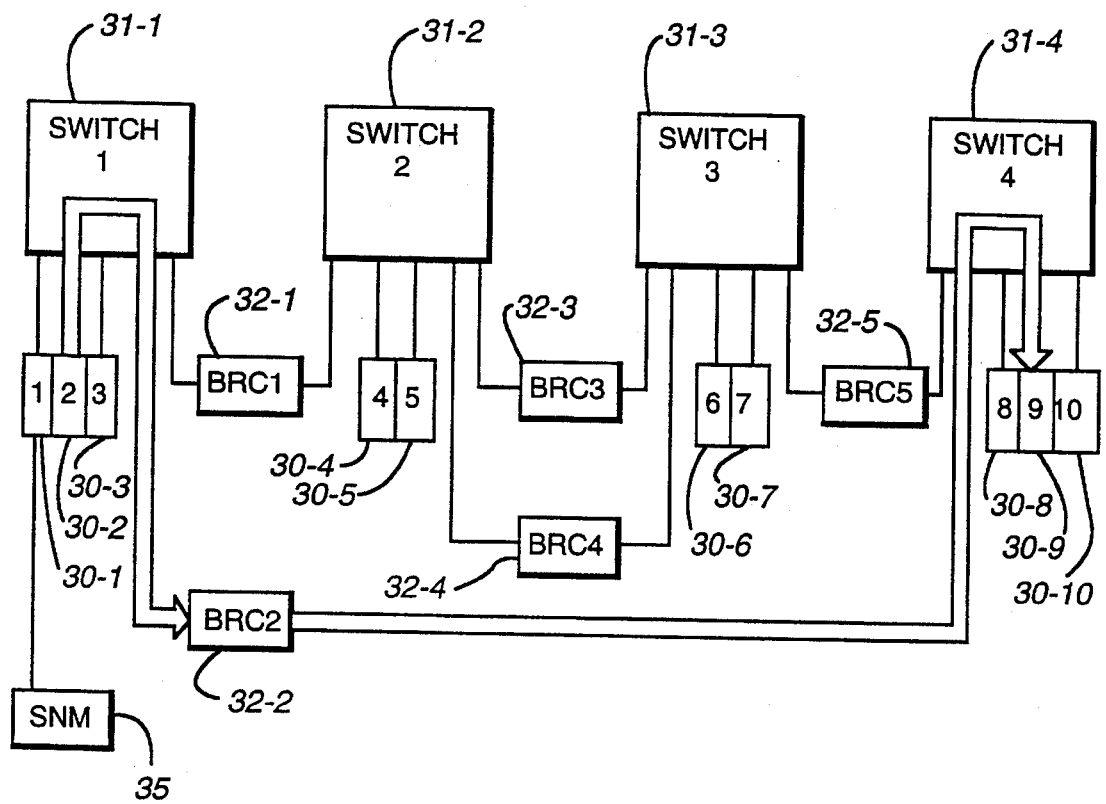
FIG. 3 represents a more complex example of a switch cascading configuration.
FIG. 4 represents an example of a Burst Routing Table used by the Burst Relaying Cascader.

FIG. 3, shows a switch cascading configuration which is similar to, but more complex than, the configurtion of FIG. 1, and which comprises four switches (31-1 to 31-4), five BRCs (32-1 to 32-5) and ten adapters (30-1 to 30-10).

This configuration uses an increased number of BRCs to improve the throughput of the switched path and the backup capability of the switching system.

In FIG. 3 the path following transmitted a burst from adapter 30-2 to adapter 30-9 is adapted by a thick arrow. This burst should have

FTDA=9

IODA=2

In the BRC 32, an incoming burst headed to a given FTDA is received in the Input Selector (In Sel) layer 20. The FTDA is decoded and used for selecting the right Burst buffer queue 28 in which the burst should be enqueued. The selection process is carried out with the help of a Burst Routing Table (BRT) 24 which specifies for each FTDA the Port ID (CTDA) to which the burst should be headed in the next switch 31. The BRC is not indentified by a CTDA since it is only used by the switch to identify the local target port, The BRC will supply the packet with a new CTDA to the next switch.

Figure 5:
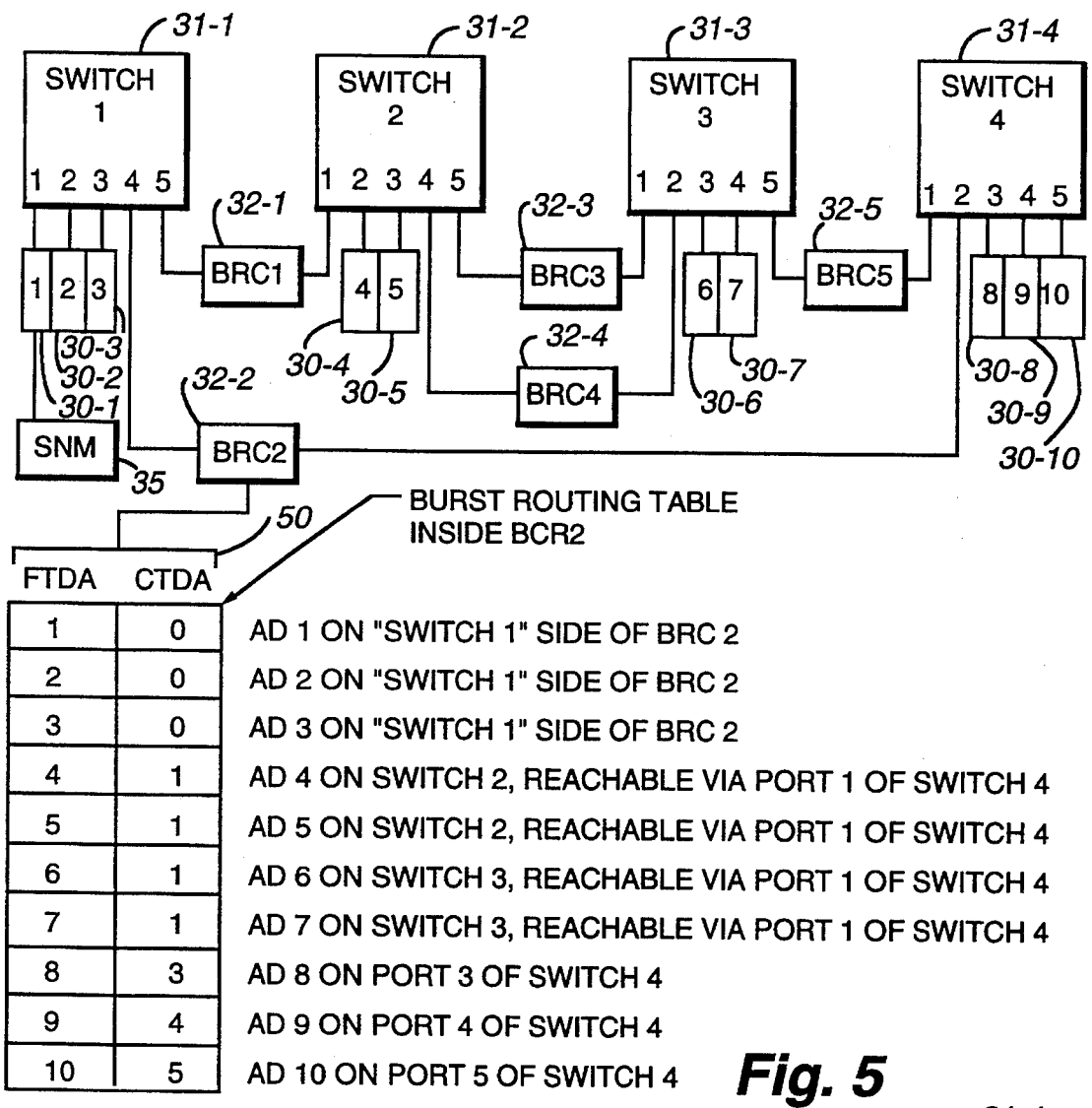
FIG. 5 represents a more complex example of the Burst Routing Table inside the Burst Relaying Cascader BRC2 (in direction "switch 1 to switch 4").

Under he exemplified network topology of FIG. 3, FIG. 5 shows the Burst Routing Table 50 of BRC2 (32-2) for its "switch 1 to switch 4" direction. Each unused entry is filled with the null CTDA=0; so each burst wrongly sent to a FTDA corresponding to CTDA=0 is discarded in the BRC itself.

Figure 6:
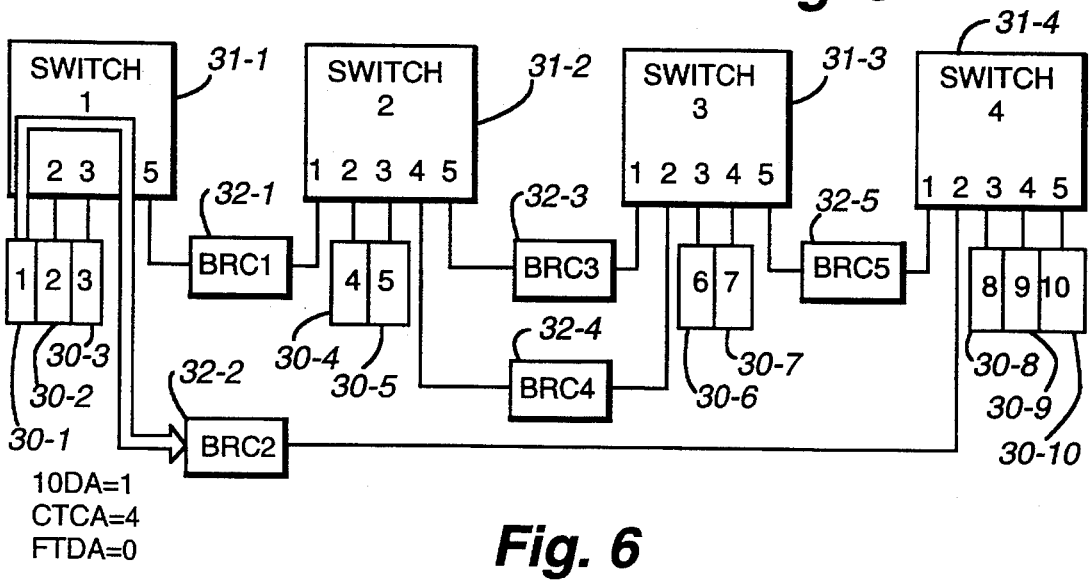
FIG. 6 represents an example of in-band path for Burst Relaying Cascader access.

The Burst Routing Tables are constructed dynamically at each network configuration change by using a spanning tree algorithm, for example. The physical path used to carry information to be written into or read from the BRT is via switch 31 (in-band path). A particular Final Target Device Address (FTDA=0) points to the BRC, if any, connected at the switch port targeted by the CTDA field. In FIG. 6 is exemplified the in-band path used by adapter 1 (30-1) to update BRC2 (32-2). Each such burst sent by adapter 1 has the address fields set to:

IODA=1

CTDA=4 (targets Port 4 of switch 1)

FTDA=0 (targets BRC connected at Port 4 of switch 1)
These address fields are added to the burst containing the data for updating the BRT. The burst should contain different information for the write or read operations.

For Write Operation the data information is
the W (write) flag
the S (Side) flag which identifies which of the two BRTs in the BRC must be updated.
the FTDA which identifies the key used in the BRT to find the CTDA which will be updated;
the CTDA which is the new value associated to the given FTDA.

For Read Operation the data information is
the R (read) flag
the S (Side) flag which identifies which of the two BRTs in the BRC must be read.
the FTDA which identifies the key used in the BRT to find the CTDA which will be read.

When the BRC receives this burst, it inserts the CTDA found in place of the FTDA and transmits the new burst to the origin adapter using the following addresses:

IODA=0
CTDA=BRT value associated with the FTDA (targets Port 1 of switch 1)
FTDA=previous IODA (targets Port 1 of switch 1)

Each adapter can update only the BRT of the BRC's directly connected to it, so if an SNM (35) is connected to adapter 1, as in FIG. 5, the SNM could directly modify only the BRTs of BRC1 and BRC2, while, in the same way, the Central Processing Unit connected to the adapters of the other switches could update the BRTs of the BRCs connected to the same switches, under the SNM control.

Figure 7:
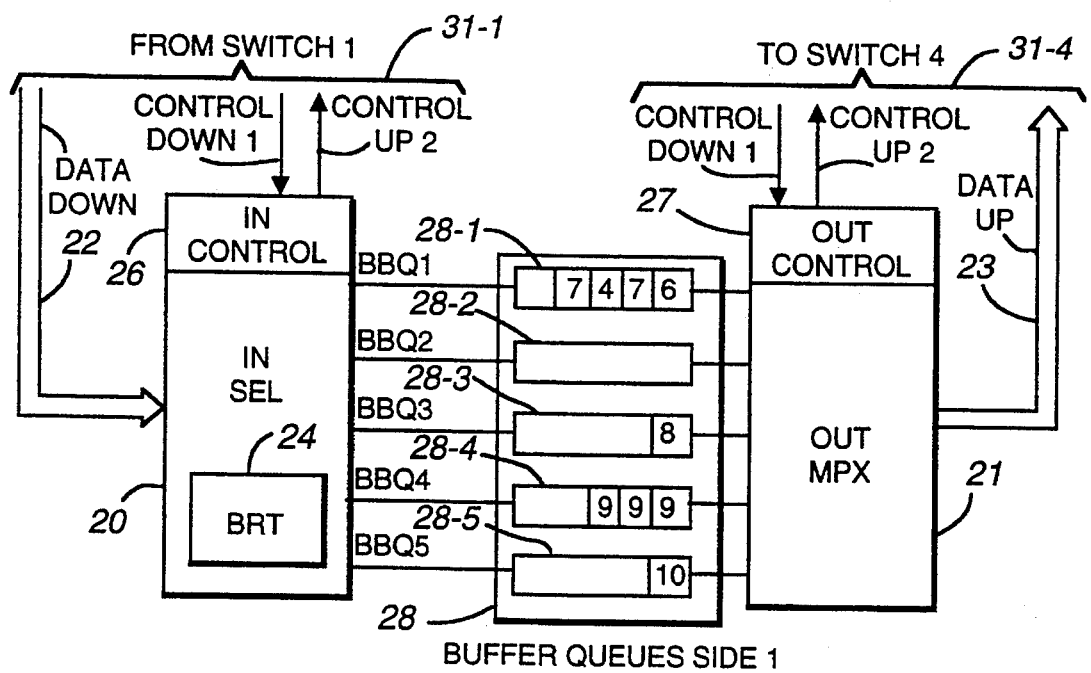
FIG. 7 represents the single adapter and multi-adapter Burst Buffer Queues.

As shown in FIG. 7, after use of the BRT information, the burst is enqueued in the Burst Buffer Queues BBQ (28-1 to 28-5) corresponding to the right port of the target switch 31-4. Then, each BBQ holds bursts for the same destination adapter (when this adapter is attached to the destination switch) or bursts for different destination adapters (when these adapters are attached to a switch which is itself reached through another BRC 32 attached to the destination switch). The filling of each BBQ 28 triggers the request mechanism of the destination switch (31-4).

Depending on the switch implementation, the request mechanism can be a Basic Request Mechanism, where the request for transmission, a SET PRDA, is sent by the BRC 32 to the destination switch 31 and a RESET PRDA is sent when a BBQ 28 becomes empty.

BBQ N becomes not empty→PRDA=N+S sent to destination switch, where 'S' is a set bit BBQ N becomes empty→PRDA=N+R sent to destination switch, where 'R' is a reset bit.

On the other hand, in an Improved Request Mechanism the incremental requests for transmission are sent by the BRC 32 to the destination switch 31 for each burst added in a BBQ 28.

BBQ N receives a burst→PRDA=N sent to destination switch where the sign '+' means that each request sent to the destination switch is added in a counter related to the requester BBQ.

Hereafter, as shown in FIGS. 3, 6 and 7, the basic and improved mechanisms, to transmit for example a burst from a BBQ (28-4) to an adapter (30-9), will be described. In the first case (basic request mechanism), 1. a BRC (32-2) sends to a switch (31-4) a request for connection to port 4 where adapter 9 is connected, through the control up wire, using the address information CTDA=4, FTDA=9, IODA=1. Therefore it sends the address PRDA=CTDA=4 with the set bit on;

2. the switch stores the request from port '2' (local address of the input port of the switch) to port '4' (CTDA) in a N squared matrix, N being the local number of ports of the switch;

3. the switch scheduler runs at each burst time its algorithm on the request matrix, trying to maximize the granted requests with regard to fairness between adapters;

4. when the request port '2' to port '4' is granted, the switch sends to the BRC (32-2) the address '4' of its next target and to the receive adapter the address '2' of its next origin;

5. the BRC 32-2 sends a burst from the BBQ4 (28-4) to the switch 31-4 with routing information address '4' (CTDA);

6. the receive adapter 30-9 enqueues the burst in a receive queue with address IODA, which will be described further;

7. the process 3 to 6 goes on until the BBQ4 becomes empty;

8. the BRC 32-2 resets its request '2' to '4' in the switch by sending on the control up wire the address PRDA=4 with the set bit off.

Figure 11:
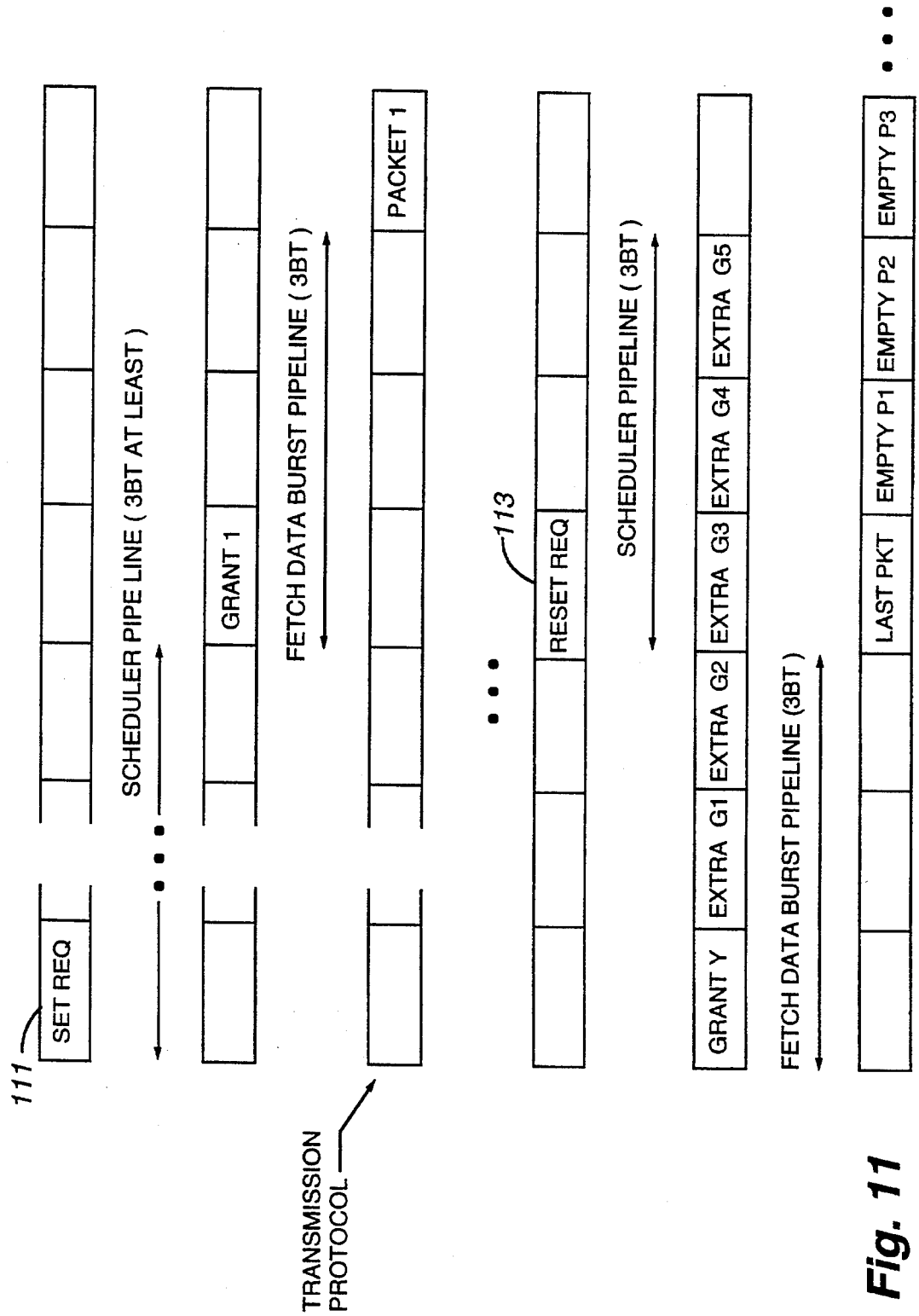
FIG. 11 represents the transmittal protocol in the basic request mechanism.

The problem which arises with pipelining in the previous protocol (basic request mechanism) is shown in FIG. 11:

the set request and reset request bits are taken into account by the centralized scheduler three burst times ("BT") after being sent to the switch by the BRC;

a granted request and the associated burst transmissions are pipelined with a delay of three burst times, this delay being utilized by the BRC 32-2 to fetch the burst in the BBQs 28-4. Due to this double pipelined processing additional grants may be sent to the BRC 32-2, depending on the constraints of the switch traffic. For these extra grants, empty burst will be sent by the BRC 32-2.

In the case of small messages the potential extra grants lead to a degraded real throughput. The extra grant problem is detailed by FIG. 11, where the 3 burst times delay, between the SET request (111) and the first grant, GRANT 1 (112), is a minimum delay and assumes that the switch constraints allow the grant of the request as soon as the request is seen by the scheduler.

Figure 12:
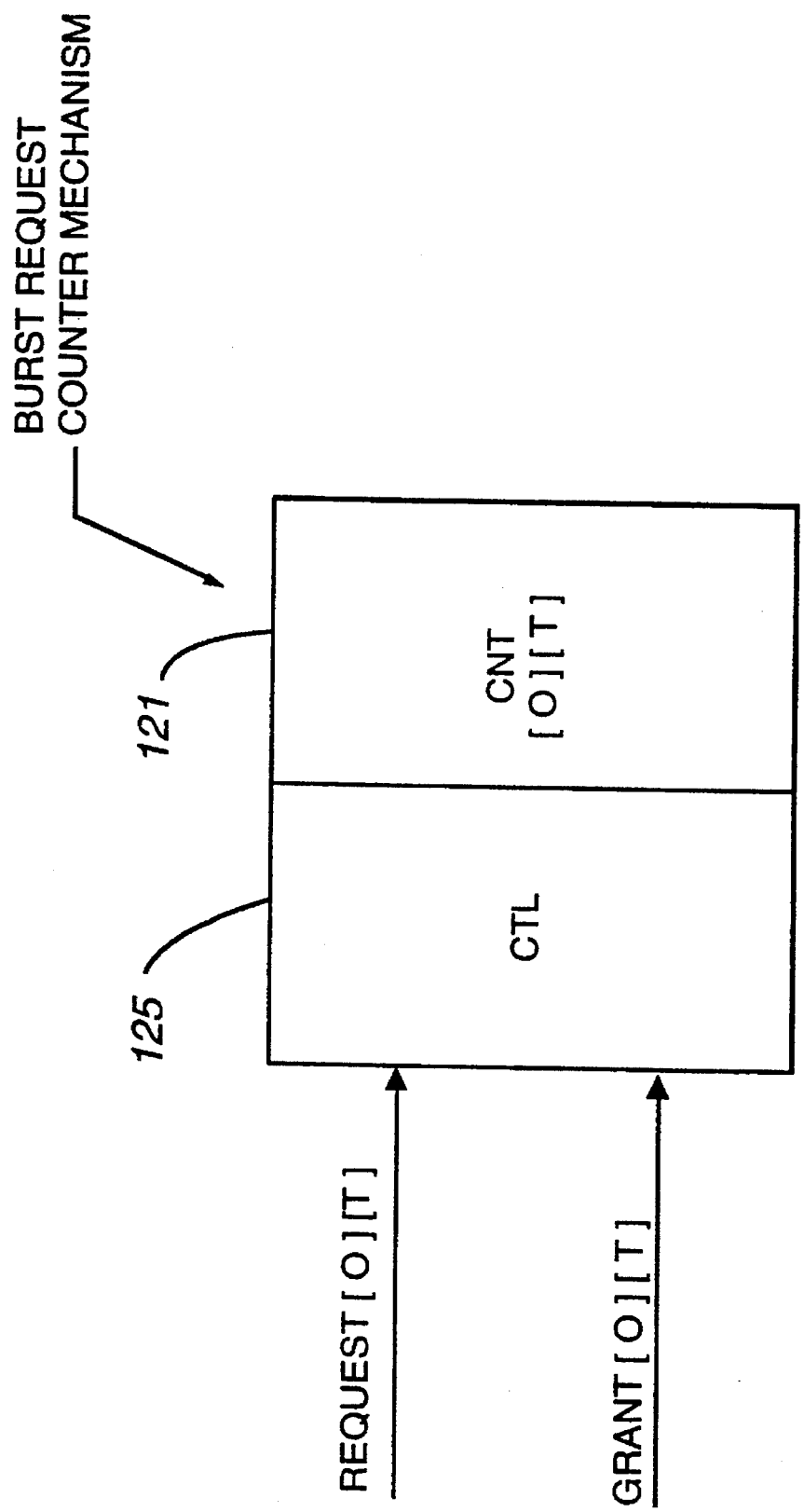
FIG. 12 represents the burst request counter mechanism.

As shown in FIG. 12, an improved request mechanism is used to solve the extra grants problem. The present set-reset request mechanism is replaced by a burst request counter (121) and control logic (125) which processes, for each possible origin O and possible target T, the request [0 ][T ]and the grant [0 ][T ]to increment, decrement or do not change the counter (121). Thus, if a request is received from adapter/BRC and no grant is given in the switch the counter will be incremented. If no request is received from adapter/BRC and a grant is given in the switch the counter will be decremented. If there are a simultaneously request and its grant or no request and no grant the counter will not be changed.

To avoid the pipeline delay of the reset mechanism, the request storage point (e.g. 2 4, meaning there is or there is not data to be transmitted from BRC 32-2 connected at port 2 of the switch 31-4 to the adapter connected at the port 4 30-9) is replaced in the scheduler by the burst request counter (121) which is incremented when the burst request 2 4 for '4' is received from the BRC connected at the port 2 and decremented when the grant 2 4 is sent to '2' for a burst connection towards '4'. A similar counter is implemented in the BRC 32-2 to prevent the switch counters from overflowing when a high number of bursts is present in the BRC's xmit BBQ. This leads to N squared burst request counters in switch 31 and N burst request counters in each BRC 32, N being the number of ports of the switch connected at the BRC.

In this new mechanism, it is no longer necessary to reset a request for connection, as this is done automatically when the burst request counter of the switch reaches the '0' value.

In the envisioned implementation, each counter of the scheduler is three bits wide allowing from '0' to '7' burst requests.

This is the preferred implementation because it optimizes the throughput of the switched path, having no penalization by void bursts caused by the pipelined request/grant process.

The processes will be the same also when the burst is sent to another BRC 32 instead of an adapter 30.

The adapters 30 supporting Burst Relaying cascading handle two types of traffic

- local traffic relates to traffic running between adapters 30 connected to the same switch 31, or returning to the same adapter 30 (i.e. for testing the link between the adapter and the switch);
- remote traffic to traffic running between adapters 30 connected to two different switches 31, thus needing to be relayed by one or more BRCs 32.

A description of the adapter interface and of its operation, showing in FIGS. 8, 9 and 13, will now be given. Only the process of transmitting data from an adapter 1 to a switch 1 will be described since the process would be the same for transmission of data bursts from switch 1 to adapter 1.

Figure 8:
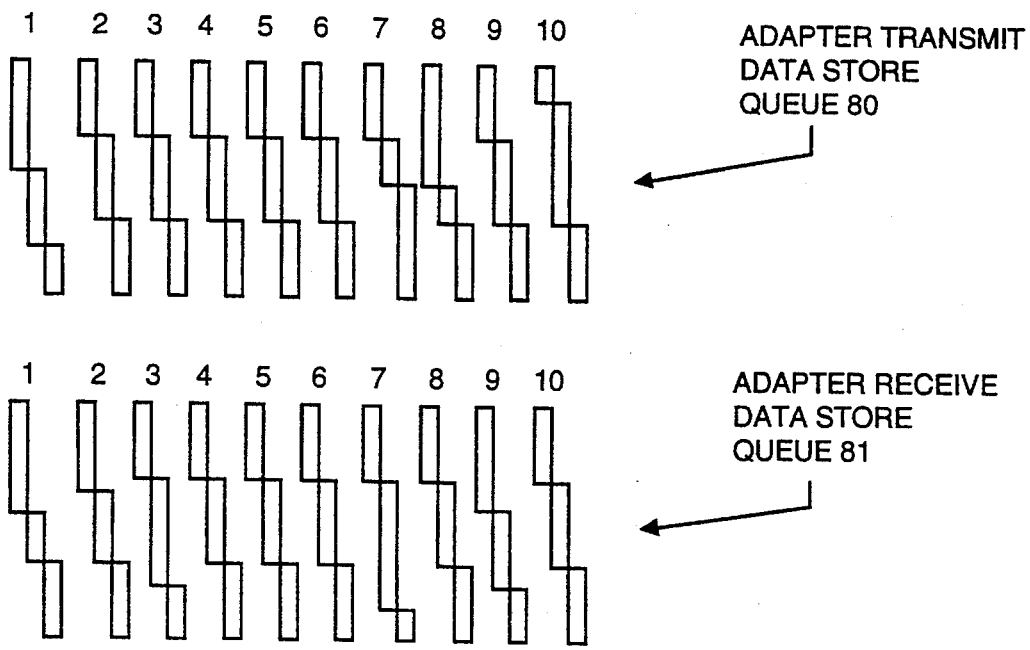
FIG. 8 represents the data store message queues.
Figure 9:
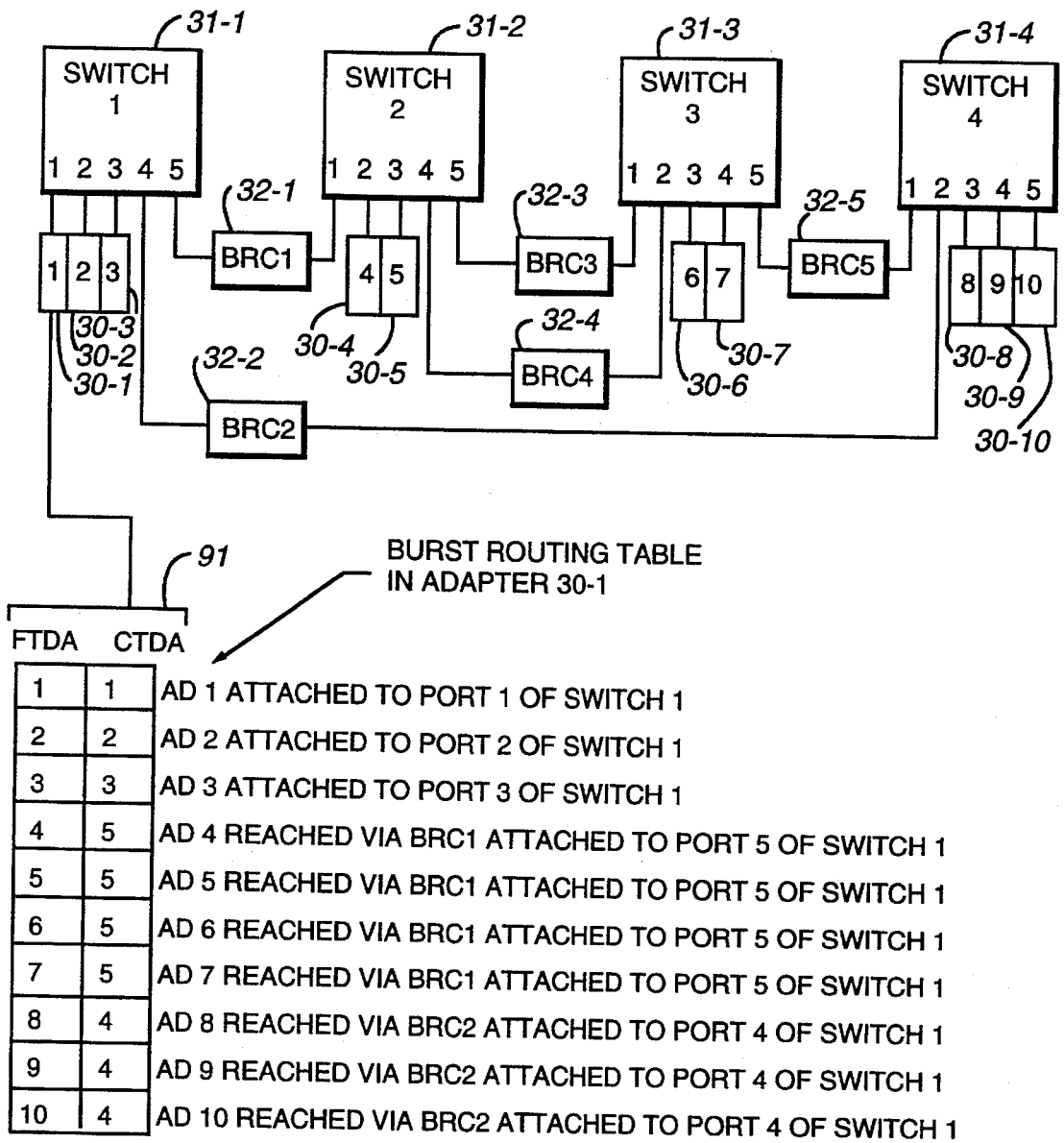
FIG. 9 represents a Burst Routing Table in the Switch Bus Adapter of adapter 1.

As shown in FIG. 8, each adapter 30 contains a data store (80 and 81) wherein the messages are chained and queued. In a preferred embodiment of the invention the data store implementation described in the European Patent application published with the no. EP 367,731 is used.

In the data store of the adapter, the message queueing architecture is the same for the two types of traffic, so it uses one xmit queue associated to each target adapter (local or remote) and one receive queue associated to each origin adapter (local or remote).

In FIG. 8, two sets of queues (80, 81) are shown, each xmt (transmit) queue and each rcv (receive) queue store the messages to/from each final/initial adapter address of the embodiment herein exemplified in FIG. 3. The architecture of an interface layer of the adapter (SBA 130 in FIG. 13: Switch Bus Adapter) depends on the request mechanism used for sending messages from the adapter to the switch. The mechanisms are similar to those described before, but the adapter interface needs to manage message queues instead of BBQs.

Figure 13:
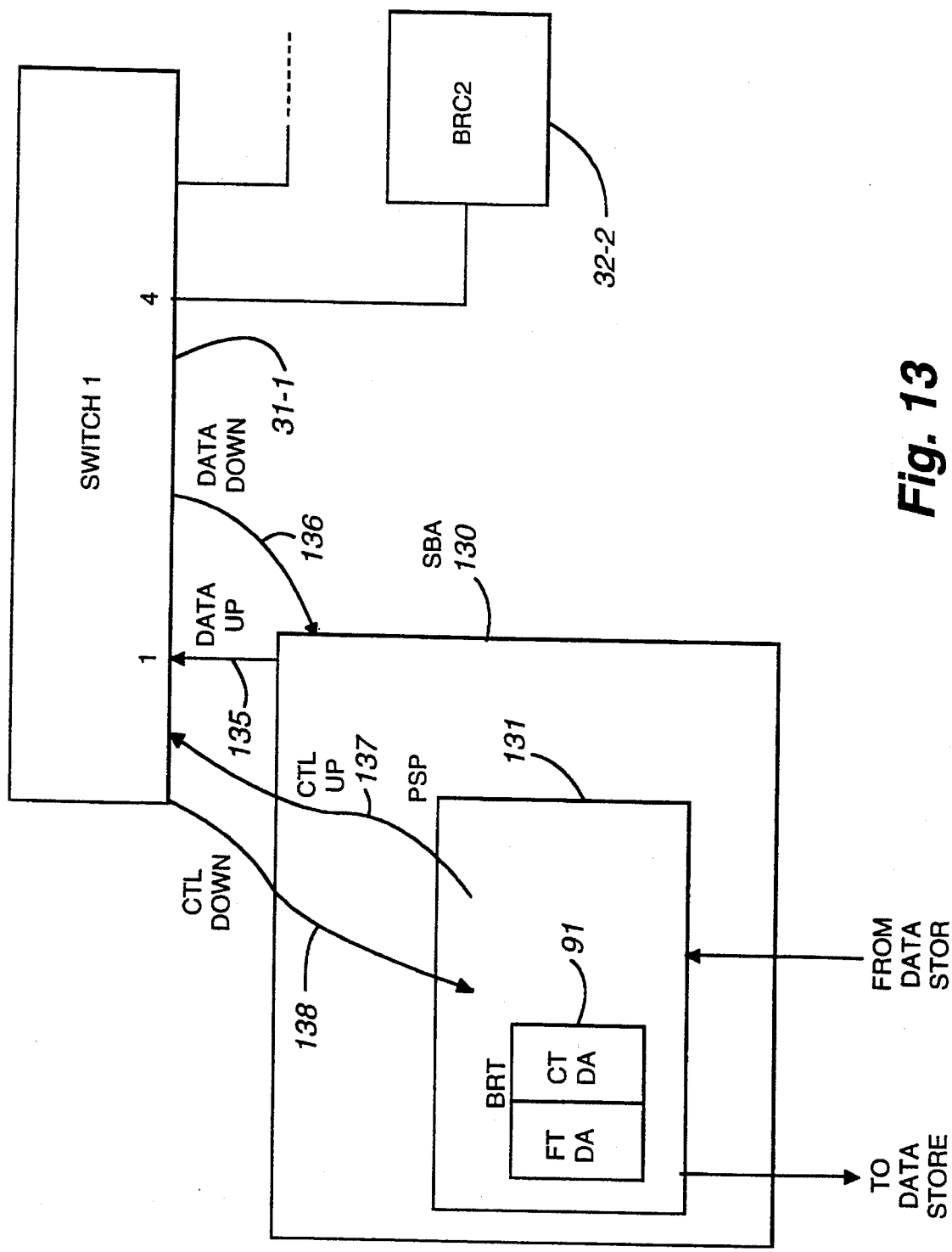
FIG. 13 represents the Switch Bus Adapter in the basic request mechanism.

As shown in FIG. 13, each 130 SBA is connected to the switch 31 through two data busses (135, 136) similar to the data busses of a BRC 32. The connection operation between the adapter 30 and the switch 31 is controlled thanks to the same control up information used by a BRC 32.

According to the basic request mechanism, the SBA (130) includes a Packet Switch Processor PSP (131), which contains a Burst Routing Table (91) similar to the BRT (24, 25) of the BRC 32, specifying the port identifier (CTDA) to which the switch 31 must route the message to reach the final target adapter 30 (FTDA). An important difference is that there is only one BRT 92, and not two as in the BRC 32, since when the PSP 131 receives a burst, it uses the IODA to address the burst in the right rcv queue in the data store of the adapter interface.

1. For example, as shown in FIG. 9 and 13, the PSP (131) of the xmt adapter 1 (30-1), sends to the switch 1 (31-1) a request for connection to another adapter (30-9), using the address information FTDA=9, IODA=1 and CTDA=4, thanks to a BRT (91). Therefore it sends the address PRDA=CTDA=4 with the bit set on.

2. the switch stores the request from '1' (port number of switch 1 to which the origin SBA is connected) to '4' (CTDA) in a N squared matrix, N being the local number of ports of the switch;

3. the switch scheduler runs at each burst time its algorithm on the request matrix, trying to maximize the granted requests with regard to fairness between adapters;

4. when the request port '1' to port '4' is granted, the switch sends to the PSP (131) the address port '4' of its next target and to the receiving BRC (32-2) the address '1' of its next origin;

5. the adapter 30-1 sends a 32 byte packet of the message (burst) stored in the Xmt queue with number FTDA of its data store to the address CTDA;

6. the receiving BRC (32-2) enqueues the burst in the BBQ associated to the FTDA address of the burst through its BRT;

7. the process 3 to 6 goes on until the message transmission completion;

8. the PSP 131 resets its request '1' to '4' in the switch by sending on the control up wire 137 the address PRDA=CTDA=4 with the set bit off.

Figure 14:
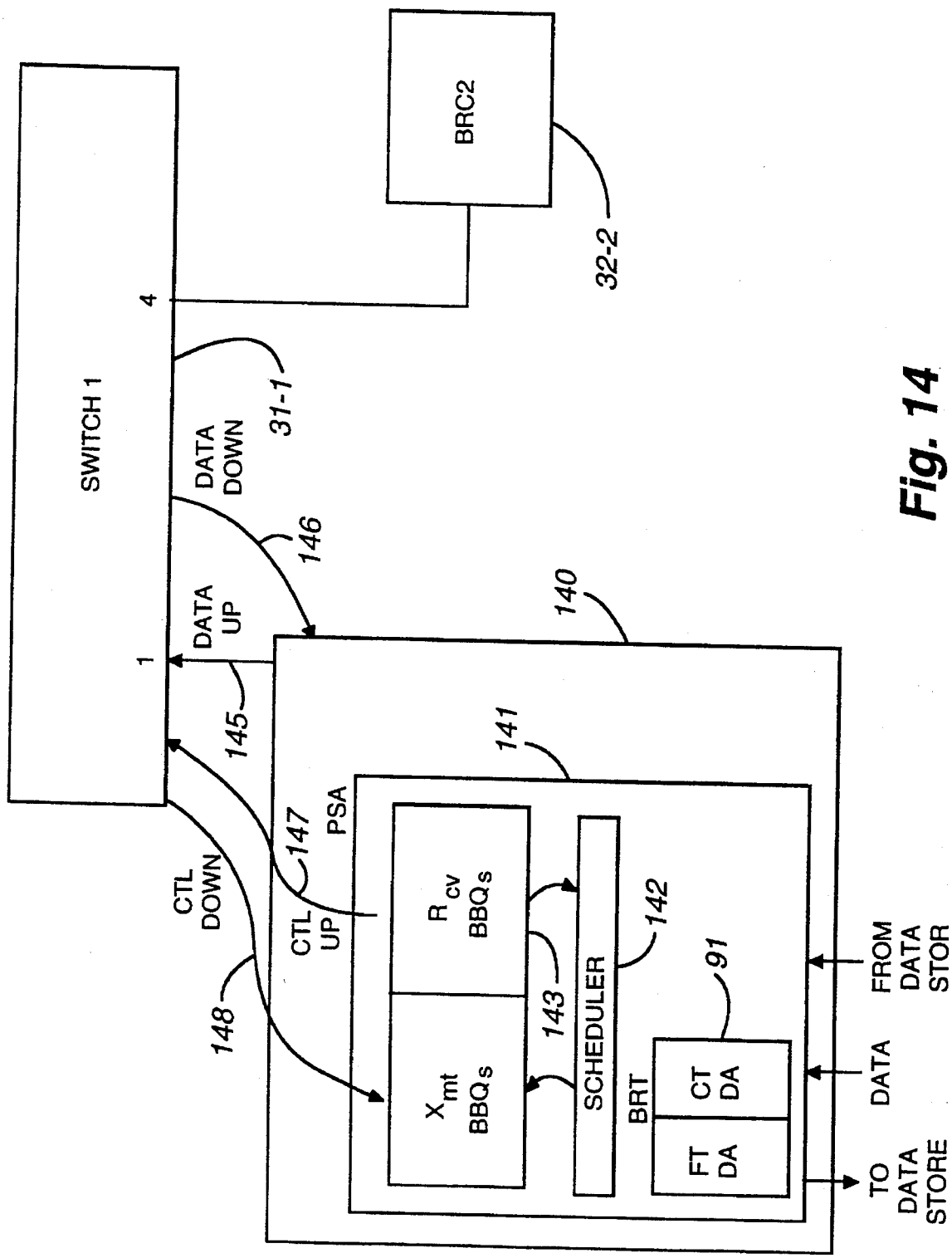
FIG. 14 represents the Switch Bus Adapter in the improved request mechanism.

To avoid the inconveniences already explained in the previous exemplification, a different SBA is used, as shown in FIG. 14.

The new SBA (140) of the adapter implements a Packet Switch Adapter function, PSA (141), which provides an intermediate buffer storing area (143) between the data store's message queues and the switch and a scheduler (142). Using the method described in the cited patent application EP 365,731, the messages will be prefetched as bursts and arranged in Burst Buffer Queues similar to the BBQs of the BRC 32, using a BRT (91), in the buffer area (143) of the PSA, before the SBA 140 receives any transmission grant from the switch 31-1. Starting from this step the request mechanism is similar to the Improved Request Mechanism already described. Thus, there is one xmt transmit BBQ and one rcv (receive) BBQ associated with each port of the switching system to which the adapter 30 is attached. For example, the data store of adapter 1 (30-1) should have 10 xmt queues (80) and 10 rcv queues (81), while the PSA of adapter 1 should have 5 BBQs for xmt direction (side 1) and 5 BBQ for receive direction (side 2).

This is the preferred implementation because it optimizes the throughput of the switched path (no penalization by void burst caused by the pipelined request/grant process).

What is claimed is:

1. A cascading switching system wherein data bursts of a fixed byte length are transmitted between adapters, comprising:

a first data switch having a first plurality of input/output ports;

a second data switch having a second plurality of input/output ports;

a burst relaying cascader interconnecting one port of said first data switch and one port of said second data switch;

a first plurality of adapters and a second plurality of adapters for exchanging data bursts therebetween;

means connecting each individual one of said first plurality of adapters to an individual port of said first data switch, excluding said one port of said first data switch;

means connecting each individual one of said second plurality of adapters to an individual port of said second data switch, excluding said one port of said second data switch;

a first plurality of data burst buffers within said burst relaying cascader facilitation transmission of data bursts from said first data switch to said second data switch, said first plurality of data burst buffers being equal in number to said second plurality of input/output ports of said second data switch; and a second plurality of data burst buffers within said burst relaying cascader facilitation transmission of data bursts from said second data switch to said first data switch, said second plurality of data burst buffers being equal in number to said first plurality of input/output ports of said first data switch.

2. The cascading switching system of claim 1 wherein:

each of said data switch ports to which said burst relaying cascader is connected is devoid of other burst relaying cascaders or an adapter connected thereto; and each of said data switch ports to which an adapter is connected is devoid of other adapters or a burst relaying cascader connected thereto.

3. The cascading switching system of claim 1 including:

first and second burst routing tables associated with said first and second plurality of data burst buffers, respectively;

said first and second burst routing tables containing a plurality of final-target-device-addresses and a corresponding plurality of configuration-target-device-addresses for data bursts;

a first plurality of burst routing tables, one for each of said first plurality of adapters;

said first plurality of burst routing tables containing a plurality of final-target-device-addresses and a corresponding plurality of configuration-target-device-adresses for data bursts; and a second plurality of burst routing tables, one for each of said second plurality of adapters;

said second plurality of burst routing tables containing a plurality of final-target-device-addresses and a corresponding plurality of configuration-target-device-addresses for data bursts.

4. A cascading switching system wherein data bursts of fixed length are transmitted between adapters, comprising:

a first data switch having a first plurality of ports;

a second data switch having a second plurality of ports;

a burst-relaying-cascader connected between one port of said first data switch and one port of said second data switch;

a first plurality of adapters and a second plurality of adapters for exchanging data bursts therebetween;

means connecting each individual one of said first plurality of adapters to an individual port of said first data switch, excluding said one port of said first data switch;

means connecting each individual one of said second plurality of adapters to an-individual port of said second data switch, excluding said one port of said second data switch;

a first plurality of burst-buffer-queues within said burst relaying cascader facilitation transmission of data bursts from said first data switch to said second data switch, said first plurality of burst-buffer-queues being equal in number to said second plurality of input/output ports of said second data switch, said first plurality of burst-buffer-queues acting to receive data bursts from said first data switch and to store said received data bursts until a transmission grant is received from said second data switch, and said first plurality of burst-buffer-queues being arranged in a queue configuration to thereby resolve asynchronism between scheduling of said data switches; and a second plurality of burst-buffer-queues within said burst relaying cascader facilitation transmission of data bursts from said second data switch to said first data switch, said second plurality of burst-buffer-queues being equal in number to said first plurality of input/output ports of said first data switch, said second plurality of burst-buffer-queues acting to receive data bursts from said second data switch and to store said received data bursts until a transmission grant is received from said first data switch, and said second plurality of burst-buffer-queues being arranged in a queue configuration to thereby resolve asynchronism between scheduling of said data switches.

5. The cascading switching system of claim 4 wherein:

each of said data switch ports to which said burst-relaying-cascader is connected is devoid of the connection of other burst-relaying-cascaders or an adapter thereto; and each of said data switch ports to which an adapter is connected is devoid of the connection of other adapters or a burst-relaying-cascader thereto.

6. The cascading switching system of claim 4 including:

first and second burst-routing-tables associated with said first and second plurality of burst-buffer-queues, respectively;

said first and second burst-routing-tables containing a final-target-device-address and a configuration-target-device-address for a data burst;

a first plurality of burst-routing-tables, one for each of said first plurality of adapters;

said first plurality of burst-routing-tables containing a final-target-device-address and a configuration-target-device-address for a data burst; and a second plurality of burst-routing-tables, one for each of said second plurality of adapters;

said second plurality of burst-routing-tables containing a final-target-device-address and a configuration-target-device-address for a data burst.

7. A cascading switching system wherein data bursts of fixed byte length are transmitted between adapters, comprising:

a plurality of data switches, each of said data switches having a plurality of input/output ports;

a plurality of burst-relaying-cascaders;

at least one burst-relaying-cascader interconnecting two of said data switches by way of a connection from said at least one burst-relaying-cascader to one port an upstream data switch, and by way of a connection from said at least one burst-relaying-cascader to one port of a downstream data switch;

a plurality of adapters for exchanging data bursts therebetween;

means connecting each individual one of said plurality of adapters to a port of a data switch;

each of said ports to which a burst-relaying-cascader is connected being devoid of the connection of other burst relaying cascaders or an adapter;

each of said ports to which an adapter is connected is being devoid of the connection of other adapters or a burst-relaying-cascader;

a first plurality of data-burst-buffers within each of said burst-relaying-cascaders for facilitating transmission of data bursts from an upstream data switch to a downstream data switch, said first plurality of data-burst-buffers being equal in number to the number of ports of the down stream data switch; and a second plurality of data-burst-buffers within each of said burst-relaying-cascaders facilitating the transmission of data bursts from a downstream data switch to an upstream data switch, said second plurality of data-burst-buffers being equal in number to the number of ports of the upstream data switch.

8. A cascading switching system of claim 7 wherein each fixed length data burst includes an initial-origin-device-address, a final-target-device-address, and a configuration-target-device-address, said system including:

a burst-routing-table associated with each of said data-burst-buffers responsive to a final-target-device-address and configuration-target-device-address for a data burst;

a plurality of burst-routing-tables, one for each of said plurality of adapters, responsive to a final-target-device-address target-device-address and a configuration-target-device-address for a data burst;

said final-target-device-address specifying an adapter for which a data burst is intended; and said configuration-target-device-address selecting a port of a switch for which a data burst is intended.

* * * * *